(12) United States Patent
Code

(10) Patent No.: US 6,237,930 B1
(45) Date of Patent: May 29, 2001

(54) MOTORBIKE RIDER TRAINING DEVICE

(76) Inventor: Keith Code, 255 Harlow Dr., Glendale, CA (US) 91206

( * ) Notice: Subject to any disclaimer, the term of this patent is extended or adjusted under 35 U.S.C. 154(b) by 0 days.

(21) Appl. No.: 09/443,761

(22) Filed: Nov. 19, 1999

Related U.S. Application Data

(63) Continuation-in-part of application No. 08/991,889, filed on Dec. 16, 1997, now Pat. No. 6,022,037.

(51) Int. Cl.7 ................................................ B62H 1/00
(52) U.S. Cl. ................................................... 280/303
(58) Field of Search .................. 280/43.13, 43.17, 280/293, 301, 302, 303, 304, 755, 765.1, 767, 265, 298, 300; 180/24.01, 24.03, 209, 219; 267/64.16

(56) References Cited

U.S. PATENT DOCUMENTS 4,133,402 * 1/1979 Soo Hoo .............................. 180/30
6,022,037 * 2/2000 Code ................................... 280/303

* cited by examiner

*Primary Examiner*—Christopher P. Schwartz
*Assistant Examiner*—C. T. Bartz

(57) ABSTRACT

A motorbike stabilizing device consisting of outriggers extending on both sides of the bike and connected pivotally and independently to the frame of the bike and designed to generate a controlling resistance force to the lean angle of the bike. A wheel is mounted near the tips of both structures which runs along the ground. An actuating lever located on the handlebars allows the rider to control the lean angle of the bike as it goes through a comer at various speeds and corner radii. The lever actuates electric valves, which control the bypass bleed from one end of two cylinders to the other. The cylinders are separately connected to both outrigger structures, keeping them firmly planted on the ground and allows the lean angle of the bike to be selected. A friction device may also be employed in place of the hydraulic cylinders and allows a reduction in size of the outriggers and a simplification in the outrigger's design.

18 Claims, 3 Drawing Sheets

MOTORBIKE RIDER TRAINING DEVICE

CROSS-REFERENCES TO RELATED APPLICATIONS.

This application is a Continuation in Part of the Application titled "A Motorbike Rider Training Device for Cornering" application No. 08/991,889 filed on Dec. 16, 1997 by the inventor and granted on Aug. 6, 1999, and now issue as U.S. Pat. No. 6,022,037.

Statement Regarding Federally Sponsored Research or Development

The present invention was not developed with the use of any Federal Funds, but was developed independently by the inventor.

BACKGROUND OF THE INVENTION

1. Field of the Invention

This invention generally relates to various methods and equipment employed in training motorbike riders on how to safely ride a motorbike in a wide variety of conditions and more specifically to the use of special outrigger devices attached to the frame of the motorbike, which extend out from the frame and contact the ground and directly control the motorbike's lean angle as it goes through a corner.

The present invention consists of two structural frames or outriggers, attached to either side of the bike extending out for a few feet with a wheel at the end of the outriggers which is in contact with the ground until the lean angle of the bike exceeds 40 degrees. The position and angle between these outriggers and the bike can be incrementally controlled by the rider by means of a lever mounted on the handlebars and controlling the pressure inside two shock struts attached to both outriggers and to the bike.

2. Description of the Related Art

In the training of new motorbike riders, one of the hardest things for the novice to learn is how to set the correct lean angle of the bicycle and the rider's body, as it goes through a corner. When any vehicle goes around a curve, a centrifugal force is generated horizontally. This force is a function of the weight of the vehicle, the radius of the curve and the velocity of the vehicle itself.

In the case of 4-wheeled vehicles, the base created by the 4 wheels naturally generates a vertical balancing moment to counteract this horizontal force. Unlike 4-wheeled vehicles, motorbikes must be leaned over through an angle, to generate the correct balancing moment when they go around a corner. This balancing moment is defined by the weight of the bike plus rider, acting at the combined center of gravity, multiplied by the distance between a vertical line through the combined center of gravity and another vertical line through the road contact point of the wheels. Thus at higher and higher cornering speeds, the rider must lean the bike over by increasingly greater angles to balance the increasing horizontal force.

If the bike is leaned too little or leaned too much it can quickly generate unstable driving conditions which can make the bike slide out from under the rider or the bike can topple to the high side (away from the corner). Learning the correct lean angle is therefore a skill that must be quickly learned by the novice. This degree of angle can at first, seem very threatening to the novice or trainee rider and so there is a need for a device to control the lean angle by some other means that is under the direct control of the rider.

In an earlier invention identified above, I describe a set of outriggers which can be installed on a motorbike and which allow the direct control of the lean angle of the bike by the rider. This earlier invention utilizes an air compressor and pneumatic valve to control the flow of hydraulic fluid through a bypass system.

The present invention is a simplified version of that earlier invention and incorporates a number of new embodiments that are improvements over the earlier application.

There are a number of existing designs in the art where extra structures and wheels are added to a basic 2-wheeled bike. For instance, sidecars have been in use for some time and are added to transport another passenger or to carry payloads. Sidecars are fixed rigidly to the bike frame and although they add lateral stability to the bike, this is a secondary factor. Further, a sidecar is only added to one side of the bike unlike the present invention, which adds a structure to both sides of the bike, and in an adjustable, controllable manner.

In the case of a motorbike and side-car, the sidecar supplies a lot of the stability that is missing in a two wheeled vehicle and creates a much more stable platform for the rider. However the sidecar is fixed to the side of the bicycle and does not move or rotate relative to the bike as the bike goes through a corner. The vertical center of gravity of the bike/side-car combination lies between the 3 wheels and so creates a moment (weight times distance) that counteracts the induced centrifugal force and subsequent moment created in the horizontal direction as the bike/side-car goes through a corner at speed. Also, unlike the present invention, the sidecar does not assist in the training of a bike rider who is learning to ride a bike with two wheels round a corner. As the rider is going through turns and corners on a 2-wheeled bike, he must learn how much to lean the bike as he goes through the corner.

Further, a bike with side-car is designed to be a freestanding system while the present invention applied to a 2 wheeled bike will allow the bike to lean over to either side. In the case of a bike plus side-car the bike cannot be leaned through corners, as the 3 wheels contacting the road act as a stable platform and lateral centrifugal forces are usually not sufficient to raise the side-car wheel off the ground, which would allow the bike to lean. This is especially true if a passenger is sitting in the sidecar or a payload is being carried.

Training wheels are also known in the art and can be used on a motorbike but they are generally rigidly fixed to the bike frame. While the bike is driven, they are used to limit lean angle of the bike to the angle, which is preset, before they contact the ground. They do not include any of the control or incremental training features of the present invention.

Also known in the art is the BMW (Bavarian Motor Works) design of outriggers, which are attached to the bike frame similar to the present invention. However, they are also positioned in a fixed relation to the bike frame, with wheels attached to the ends of each outrigger, which have a space between both of the wheels and the ground while the bike is moving in a straight line. When the bike is leaned over sufficiently in a corner, one of the outrigger wheels touches the ground and so limits the amount of lean.

A shock absorber is also used in the BMW design but only to reduce the impact forces in the case of a sudden lean that allows the outrigger wheel to hit hard on the road or track surface. This BMW device is designed mainly to measure wet weather traction forces on different types of tires. It has no capacity to allow incremental lean angle changes to the system and can not be used for quick turn and steep lean angle tests as can be done by the present invention.

The BMW bike outriggers could high-side the rider in a corner, as they do not maintain close contact between the outrigger wheels and the road, as in the present invention.

The definition of 'high-side' as used in the disclosure is the action of a two-wheeled bike going through a corner and the front or rear wheel (or both) slips away from the cornering center then suddenly re-grips the road surface. This sudden re-grip can generate a large reaction force which acts to rotate the bike towards the vertical axis and which can be sufficiently strong to throw the rider off the bike.

The definition of 'low-side' as used in the disclosure is the action of a two-wheeled bike going through a corner and the front or rear wheel (or both) slips away from the cornering center, causing the bike to fall down.

The definition of lean angle is the angle between a line perpendicular to the ground and the bike's vertical axis, as the bike leans over during a turn.

Apart from the inventor's earlier invention described herein, there is nothing in the prior art that allows the rider to overcome his fears in the manner of the present invention. The performance of the present invention can also be easily adjusted by changing orifice sizes in the hydraulic cylinders, which control the force required to change the lean angle for the rider. Thus control features of the invention can be changed to match the rider's confidence level as he improves his skills.

This natural fear that occurs when a novice is learning to ride a motorbike when turning into a corner is very real and must be overcome for the rider to become skilled at handling a bike under a wide variety of road conditions.

To traverse a right hand corner for example, the bike handlebars must first be turned to the left, away from the corner. This causes the bike to fall or lean to the right, due to centrifugal force generated on the bike and acting in a direction away from the center of rotation. Thus as the bike leans to the right, the front wheel automatically turns around to the right and helps to set the cornering radius of the bike and the bike's lean angle, as it goes around the right hand corner.

Since the bike has two wheels, it must be leaned into the corner deliberately by the rider, to offset the centrifugal force, which is trying to overturn the bike to the left. The tighter the radius of turn and the higher the road speed, the more that the bike must be leaned over, in some cases as much as 40 or 50 degrees from vertical. For most novice riders, there is a natural fear of leaning the bike too far, as this action appears to bring the bike and their body dangerously close to the ground.

There is also a fear of causing the bike to fall down or in the act of leaning far enough to make a turn, impacting some structural parts of the bike against the ground such as the footrest or oil pan. If this impact occurs, then weight is transferred off the wheels to the footrest for instance and the tires can loose traction causing the bike to fall over to the right, which may trap the rider's leg against the ground.

There is also the danger of a bike being leaned into a corner too much, causing the rear or front tire to slip and turn the bike further into the corner. The rear or front tire may then re-grip the road surface, creating a very strong force, which tries to straighten the bike up, and which can 'high-side' the rider.

Another natural fear exists for the rider, of trying to avoid an obstacle in front of the bike and quickly turning the bike to either side, and so causing it to fall over. This fear is of course enhanced in any reduced traction conditions such as in rain, in mud or in gravel or on an oil spill.

Because of the nature of the dynamic forces acting on a motorbike as it goes through a corner at speed, and the inability of the bike's 2-wheeled structure, to counteract these forces, it is necessary for the rider to learn to balance these forces by leaning the bike and his body towards or into the corner. If not done correctly there is a considerable risk of the bike's tires loosing traction on the road or track surfaces allowing the bike to go into a skid and 'high-siding' or 'low-siding' the rider.

Leaning one's body with a bike into a corner nins counter to all basic instincts for the rider's safety, as the preference is to maintain the body in a position close to vertical. To efficiently ride and maneuver a bike the rider must learn to lean his body with the bike to a quite alarming extent and overcome this strong survival instinct, The present invention is designed to teach the rider how to overcome this instinct. and lean through a corner correctly at different speeds and corner radii and so allows him to gain confidence in his riding skills while eliminating many of the dangers described herein. The invention also allows the rider to overcome the fear of leaning his body over with the bike in a corner instead of trying to maintain his body in an upright position, which requires leaning the bike further over than is necessary.

This has the advantage of less bike lean angle in a turn hence better use of the correct tire surface, which creates a better traction situation. It also requires less work from the rider, as he does not have to force the wheel over to get the correct lean angle; instead he uses his body to work with the bike to get the best lean angle. Another advantage of this correct lean angle is that in an accident situation, the rider can respond faster to the situation and turn the bike more quickly and so avoid a collision.

It is very important for the rider to learn to set the correct lean angle and hence turn radius, at the start of the turn through a corner as quickly as possible so corrections are kept to a minimum. Each correction made through a turn creates a degree of instability of the bike and rider with a resultant reduction in traction. By overcoming the rider's fear of leaning the bike quickly and through steep lean angles, this allows the rider to quickly set the correct lean angle and so go through the corner in the best and safest possible manner.

It is important that the rider learns how to lean a hike in a corner, become familiar with traction limits while cornering and to be able to safely turn quickly to avoid accidents. In accident avoidance at high speed bike riders must be able to quickly lean the bike to either side to get around objects in the road or track. The faster one approaches a turn on a bike the further one has to lean the bike over to go through the turn.

More than 50% of bike street accidents are caused by motorists turning their cars towards the left in front of a bike going the other way. If the rider is afraid of quick turns his only choice is to try to brake to avoid the accident which often is not enough. Similarly with road hazards and items falling off a truck or van which fall into the road in front of the bike, requiring the need for speedy and evasive action.

Against all instinct when going through a corner in the wet under nower, if the rear wheel slips, the first impulse of the novice rider is the cut the throttle which causes the rear wheel to slip to the opposite side of the turn and once the wheel regrips the surface, the large sudden braking force can easily throw the rider off the bike tip into the air as the bike straightens up. The present invention trains the rider to correctly lean the bike into the corner thus minimizing the possibility of a slip. He is trained to maintain the throttle position despite side slin and So he can maintain the slin through the corner or in the extreme case induce a low side fall, which is a better alternative than a high side crash.

Unlike the limitations of the other inventions noted in the art, the present invention allows the rider to press and release a pressure bleed lever located on the handlebars, which releases air by opening a valve inside a bypass line from the top to the bottom of a control cylinder attached to the two structures, thus allowing the bike to lean further to the side in a controlled, incremental manner. When the lever is released, the rider feels a reassuring resistance to any further lean as the bike now continues to lean very slowly, as oil bleeds through the orifice hole inside the cylinder. Furthermore there is a maximum lean set in the invention, which ensures that no part of the bike can hit the ground This reassurance to the rider allows them to experiment with lean angles in turns with much greater confidence and so speeds up their training in this important skill.

BRIEF SUMMARY OF THE INVENTION

The present invention is a set of two outriggers designed for installation on the frame of a motorbike and which are constructed in such as manner as to contact the ground on both sides of the bike and thus allow control of the lean angle of the motorbike during cornering. In the earlier application described above, the inventor disclosed a hydraulically operated outrigger design for controlled cornering of a motorbike. The preferred embodiment of the present invention incorporates an electrical means for controlling the degree of lean angle. Other embodiments described herein incorporate a friction device for controlling the lean angle of the bike.

DETAILED DESCRIPTION OF THE INVENTION

Figure 1:
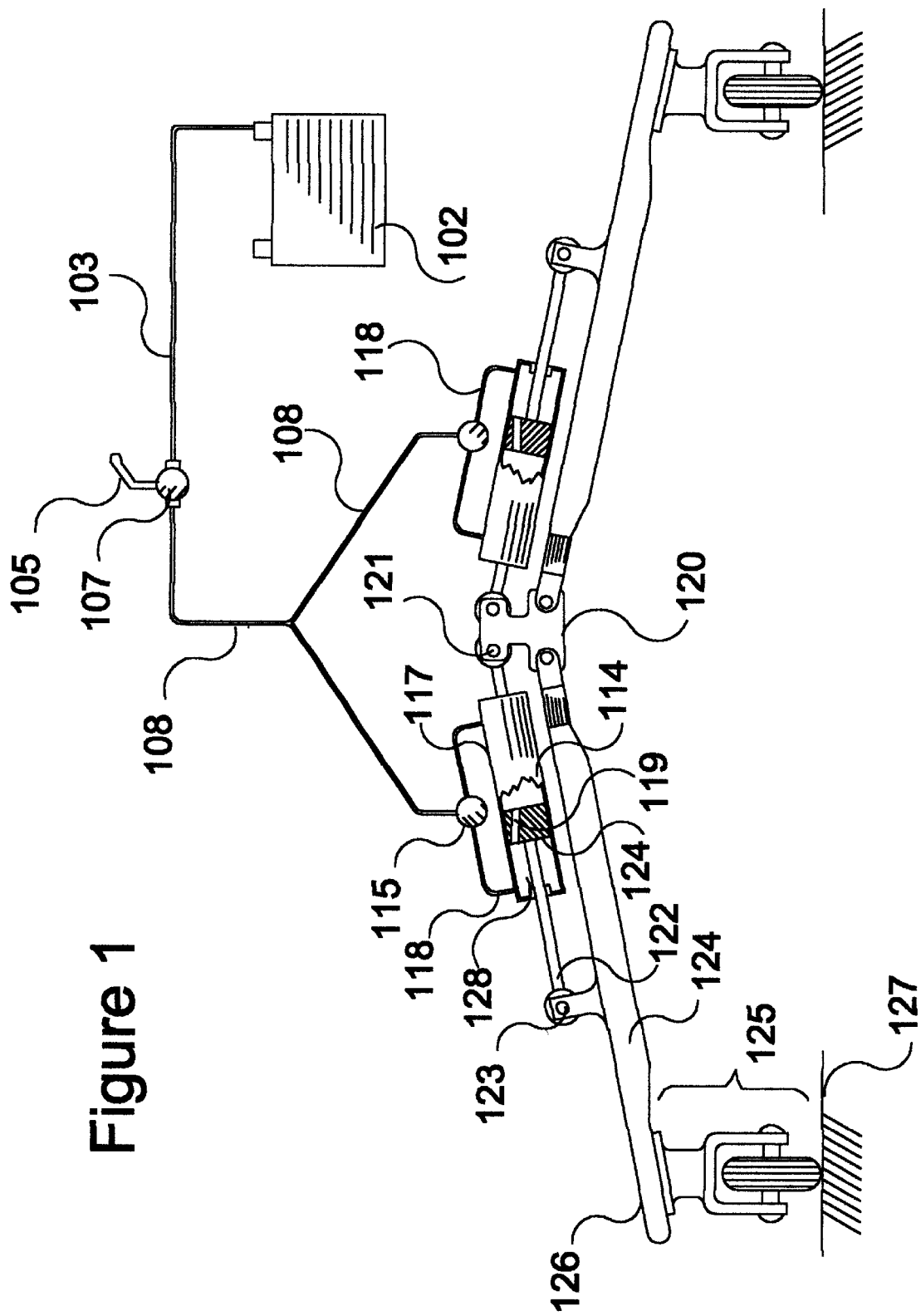
FIG. 1 is a front view of the electro-hydraulic device operated outriggers.

FIG. 1 of the present invention shows a schematic layout of the main components of the present invention. The system uses an electrical switch (107) activated by a lever (105) connected by an electrical lead (103) to the motorbike battery (102). A lever (105) connected to the handlebar of the bike (not shown) and contains a switch (107), which is connected by electrical leads (108,108,108) to two electric valves (115,115). Each electrical valve (115) is located in an oil bypass line (118). Each bypass line is connected to the wall of a hydraulic piston assembly (114) and allows oil to pass through the wall of the piston cylinder (117). When both electrical valves (115) are closed, no hydraulic oil can flow in either direction through the hydraulic cylinder bypass lines (118,118). Thus any attempt to lean the bike to the left will create a force on the piston which is reacted by the hydraulic oil being trapped between the piston surface and the cavity (128) inside the hydraulic cylinder. The oil then builds pressure on one side of the piston (124), which forces the oil to pass through the small orifice (119) to the lower pressure side. This creates resistance to the leaning force applied by the rider to the bike and so the bike lean rate is reduced.

The hydraulic cylinders are attached through pinned joints (121) at one end, to a pillar (120) which is rigidly attached to the frame of the bike (not shown). The pistons (122) extending out from the hydraulic cylinders (114) are attached by pins (123) to the two outriggers (124) The outriggers (124) are also pinned at one end to the pillar (120), which in turn is rigidly attached to the bike, frame (not shown). Two wheels (125) are attached to the ends of the outriggers (126) and contact the ground (127).

When the lever (105) is depressed, the electrical switch (107) opens the electrical valve (115) which allows the hydraulic system bypass to operate by allowing oil to escape from the hydraulic cylinders(110) through the bypass lines (118) and into the back of the cylinders (114) As the hydraulic cylinder piston (122) moves inside the cylinder (114) the bike can lean further over as desired by the rider.

When the lever (105) is released by the rider, the electrical valve (115) closes, shutting off the oil bypass going through the line (118). The rider can continue to lean the bike, but now the lean is controlled by the small orifice valves (119) inside the hydraulic cylinders (114) which requires some force to overcome and offers considerable resistance to further lean of the bike.

This resistance gives the rider a feeling of security and safety, as the bike cannot now suddenly lean over without his control. This same mechanism is repeated on the other side of the bike. The rear frame of the outrigger (124) is attached to the bike frame at two points not shown and aligned with each other and pinned so that the entire outrigger structure can rotate freely upwards and downwards.

EXAMPLE

In an example of the present invention, two outrigger structures were manufactured in accordance with the present invention and attached to the frame of a Kawasaki ZX6R racing bike. An electric lead line was nin run from the battery to a switch installed on one of the handlebars, in easy reach of the riders hand. An electrical connecting line was run down from the handle bar switch down to an electrical valve installed on each bypass line above the two hydraulic pistons as illustrated in FIG. 1 above. A separate mounting plate was installed underneath the oil pan of the bike gearbox and carried the rear connecting points for the outriggers. The outriggers were welded out of thin walled tubing. Small wheels were attached at the extremities of the outriggers. As described in FIG. 1 above the necessary pressure lines and hydraulic cylinders were also installed and connected together.

The bike with the outriggers and other components installed was driven around a track and as the bike was cornered, the handlebar switch was depressed and the bike was leaned over. Release of the switch fixed the lean angle immediately and the slow leak of oil through the bleed valve orifice located in the hydraulic cylinder piston created a noticeable and satisfactory resistance against further lean of the bike. As the bike continued around the corner leaning over, both outrigger wheels were in contact with the track surface and the whole bike and outrigger system felt very stable.

Figure 2:
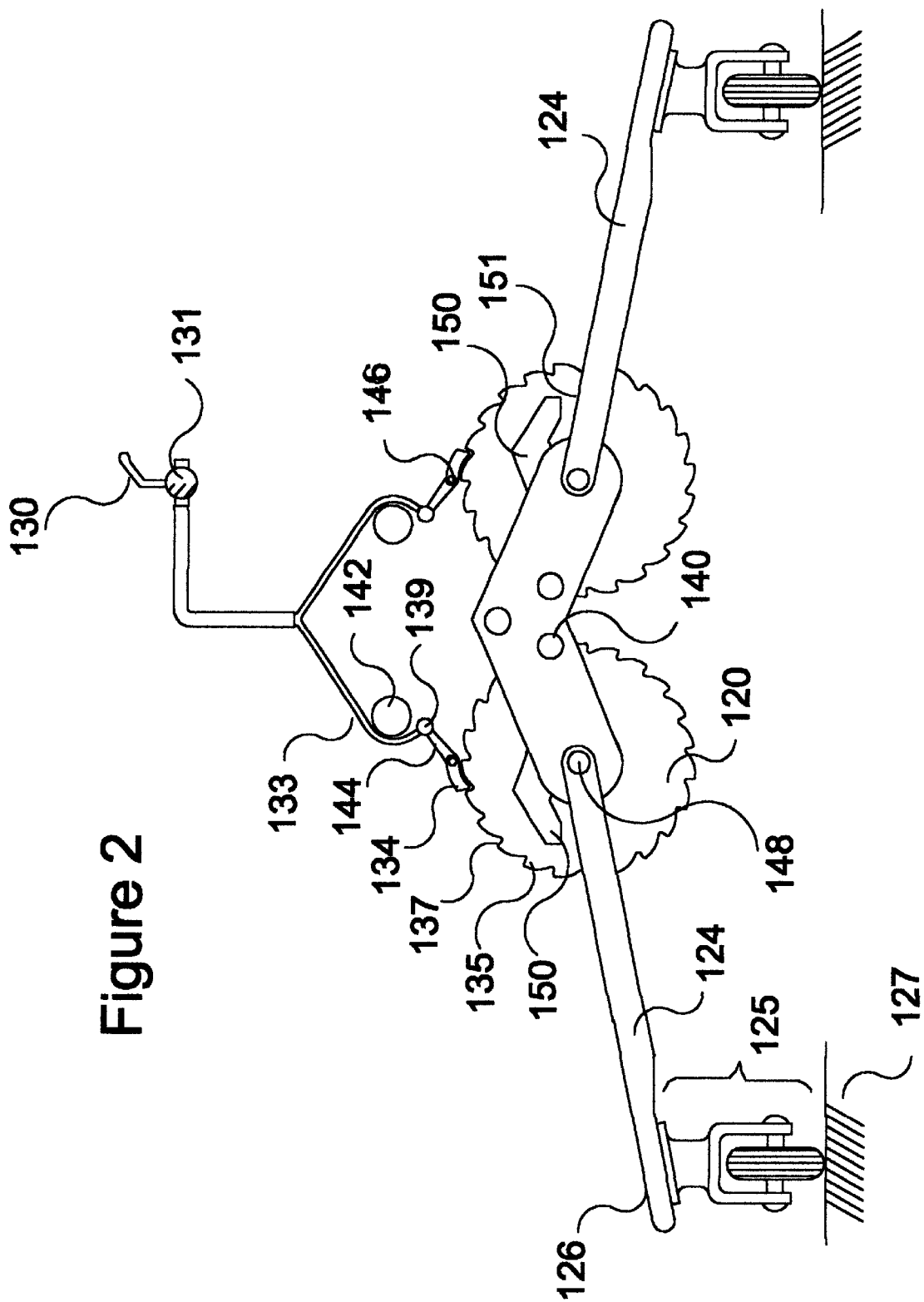
FIG. 2 is a front view of the friction device operated outriggers.

In a second embodiment of the invention, the hydraulic cylinder and bypass system as shown in FIG. 1 can be replaced with other means for controlling the bike's lean rate. For instance, a friction device as shown in FIG. 2 can be used and is described as follows. A circular friction device (135) is mounted on the motor bike frame attachment (120), which is connected to the frame of a motorbike (not shown), through boltholes (140). The friction device (135) is connected in turn to the outrigger arm (124) through a bolt (149). The outer rim of the friction device has a series of ratchet teeth (137). A pawl (134) fits into the ratchet teeth and rotates around a bolt (146), which is connected to the bike frame (not shown). On the other end of the pawl is an extension arm (144), which connects to the end (139) of a cable (133). The cable passes over an idler wheel (142) and is connected with a similar cable from the second outrigger pawl and both cables are connected to the cable puller device (131) mounted on the handlebars. The puller device is activated by a lever (130), which the rider pushes.

An angular bracket (150) is positioned on both sides of the main pillar (120). This bracket limits the total amount of upward angular rotation of the outrigger (124).

The friction device (135) resists motion of the outrigger inwards but disengages when the outrigger moves downwards. Thus when the bike is rotated into a corner, the friction device on the lean side of the bike resists the bike's rotation and so generates a force tending to keep the bike upright The degree of force that the friction device can generate is preset, before the rider gets on the bike. Details of the friction device are more fully covered in the description of FIG. 3.

By engaging the cable (133) the rider can pull both pawls (134) out of engagement with the ratchet teeth (137) of the friction devices (135) and so the bike can be rotated into a corner without any resistance from either outrigger. This allows the rider to quickly rotate the hike into a corner without activation the outriggers and then by releasing the lever (130), the pawls re-engage and now further rotation of the bike to the left or right is resisted by the outriggers as before. Thus the rider can set steeper and steeper lean angles safely until he becomes nroficient in operation of the bike through a wide range of lean angles. Note that in the friction device, presetting the friction force has the same effect as pre-selecting the piston bleed hole, in the hydraulic version described in FIG. 1 Also engaging the lever (130), which disengages the pawl (134) has the same effect as opening the bypass valve in the hydraulic version in FIG. 1. Thus we can see that the version of the invention described above is another embodiment of the invention described in the anplication and in the earlier application referenced.

Figure 3:
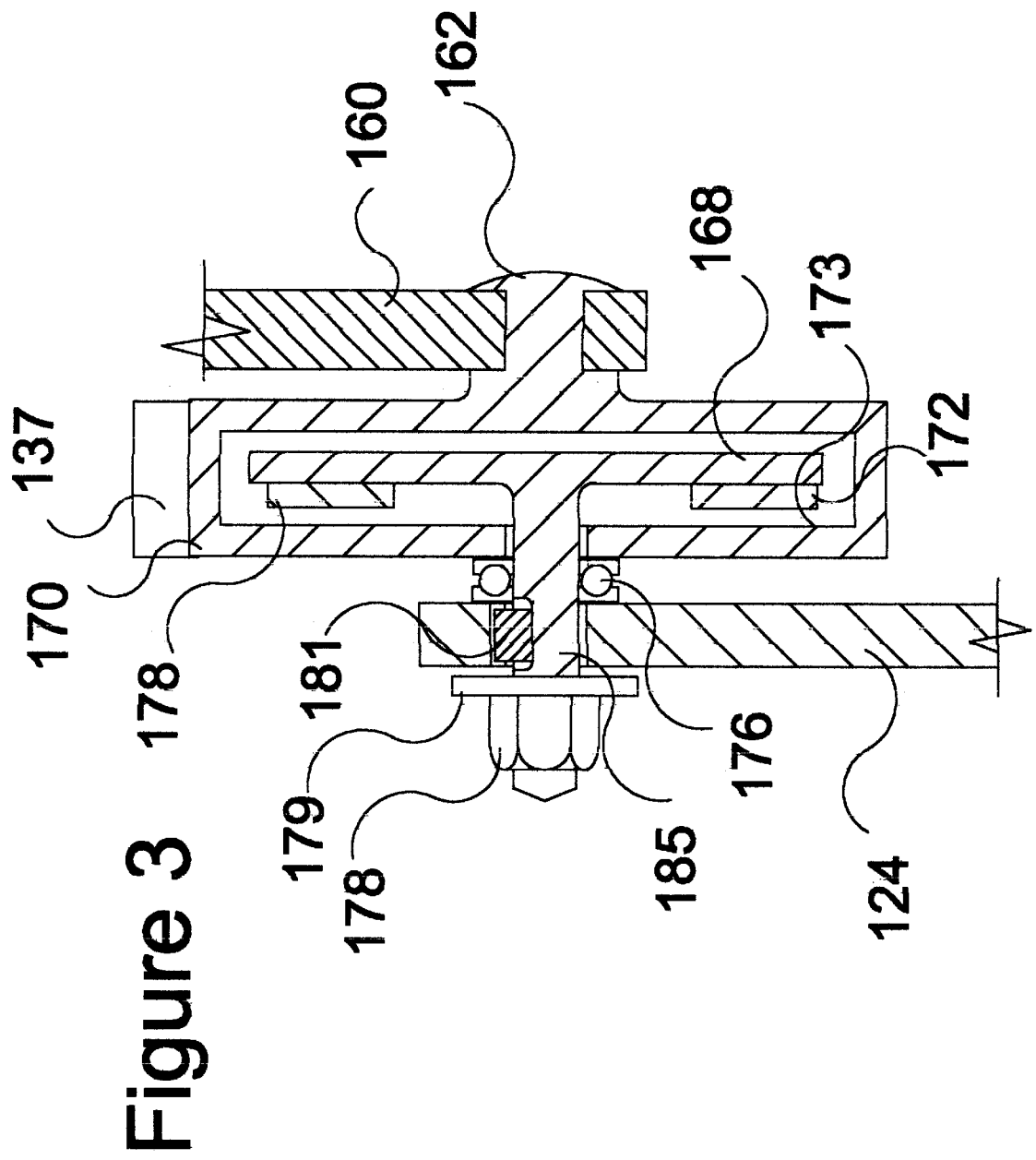
FIG. 3 is a cross section view of the friction device.

FIG. 3 illustrates a detailed cross section of one embodiment of the friction device. The outrigger arm (124) is rotationally rigidly connected by means of a shaft pin (181) to the disk rod (185), which is an integral part of the friction disk (168) inside the housing (170). The housing (170) is rigidly attached to the bracket (160), by welding the head of the rod (162) onto the bracket. The bracket is rigidly connected to the bike frame (not shown)

A roller bearing (176) is located between the outrigger arm (124) and the external wall of the housing (170). The roller bearing allows the friction disk (168) and outrigger arm (124) to rotate freely, independent of the housing (170). The friction disk (168) has two friction pads (178,172) which contact the inside surface (173) of the housing (170). When the nut (178) is tightened, the outrigger arm is free to move horizontally, which allows friction engagement of the disk pads (178,172) with the inside of the housing surface.

The position of the nut (178) determines the amount of force generated between the disc pads (178,172) and the housing inside surface (173). This force then generates the friction resistance to turning of the outrigger arm, when the bike is leaned over. The pawl tooth (137) is shown on the outside surface of the housing (170), without the pawl engaged.

The addition and employment of the invention allows a novice rider to overcome the natural fear that exists when the rider has to lean the bike over while turning a corner or when the rider suddenly leans the bike over to change direction quickly as is necessary to avoid an object in on the road or track, in front of the bike.

Also, the invention can be effectively used in the testing of new tires and suspension components such as shock absorbers and can be used to study motorbike frame stiffness and flex under a variety of road surface conditions and speeds. Presently, when tires and other motor bike components are tested it is difficult to maintain the extreme conditions necessary to determine margins of safety, for more than a few seconds mainly because of the danger to the rider.

For instance, the conventional method for testing a tire's grip and road surface compliance, is to take the bike through a hard corner and lean it over, but there is a limit to what even an experienced rider will attempt, due to the danger mentioned before, of the bike high-siding or low-siding and causing bodily harm to the rider.

By use of the outriggers of the present invention, the bike can be leaned over to extreme conditions and driven around corners with poor road surfaces, then if the bike high-sides for instance, the outriggers will absorb the shock when the tires re-grip the surface slowly returning the bike toward the vertical and the rider will not be unseated off the bike.

The invention is also helpful in the development of new tires and different suspension components, by increasing the actual time that the bike can be pushed to extreme operating conditions, allowing the collection of much more data. Secondly, the total amount of time required to collect test data can be greatly reduced.

OBJECTS AND ADVANTAGES

In summary the objects and advantages of the present invention are that its use permits the novice rider to overcome his natural fear and to safely experience a broad envelope of bike maneuverability, quickly, safely and with confidence.

In particular the objects and advantages of the invention are to help the rider overcome the natural fear of steep lean angles, the fear of quick or sudden turns and the fear of losing traction.

Further objects and advantages are that the rider learns to lean his body with the bike in a turn, thus lowering the center of gravity of the bike/rider combination, which creates the most stable conditions.

Another obiect and advantage is to train the rider easily to set the correct turn radius through a corner as quickly as possible, so further corrections which can create bike/rider instability, are not needed. Another object and advantage of the invention is to increase the rider's prediction of the bike's path through a corner, thus increasing his safety and stability.

Another object and advantage is the use of electrically operated valves to produce a fast response time to the motion of the handlebar switch. Another object and advantage is to reduce the size of the outrigger resistance force generating system by use of a compact friction device.

Althotigh the description above contains many specificities these should not be construed as limiting the scope of the invention but as merely providing illustrations of some of the presently preferred embodiments of this invention. For example, the outriggers can have many structural shapes, the hydraulic piston used on the outrigger may be changed for a pneumatic piston, or one operating on water instead of oil, or the wheels on the ends of the outriggers could be replaced by skids or multiple rollers.

Further, the friction device described herein can take many forms, such as a series of one or more metal plates with small holes, which control the flow of a fluid, thus generating a resistance force. Also, a friction device such as a brake pad and calipers may be employed to generate the resisting force.

Thus the scone of the invention should be determined by the appended claims and their legal equivalents, rather than by the examples given.

What is claimed is:

1. A motor bike outrigger comprising;
    a) at least one structure adapted to be pivotally attached to a frame of a motorbike having a plurality of wheels at a plurality of locations; said at least one structure adapted to extend laterally to the direction of travel of said motorbike when said wheels are rolling;
    b) said at least one structure having a proximal end adapted to be pivotally attached to said frame of said motor bike, said at least one structure also having a distal end, said at least one structure also having a training wheel attached at the lower surface at said distal end thereof, said training wheel being adapted to contact the ground;
    c) said one structure further comprising;
        a) a hydraulic cylinder having a first end adapted to be pivotally attached to said frame of said motor bike, said hydraulic cylinder further having a piston positioned internally and surrounded by said hydraulic cylinder, said piston being movable with respect to the first end of said hydraulic cylinder and further having a one end of a piston rod attached to said piston, the other end of said piston rod extending outside said hydraulic cylinder and further being attached to the distal end of said at least one structure, said hydraulic cylinder having a second end opposite said first end, said hydraulic cylinder having an orifice at each end of said first and said second end, whereby said piston may be moved within said hydraulic cylinder by the action of a fluid passing through the orifices;
        b) a bypass line having a bypass valve controlling the passage of fluid flowing between said orifices;
        c) said fluid further being capable of flowing between said opposite sides of said piston by means of a control orifice within the piston;
        d) said bypass valve controlled by an electrical means;
        e) a switch said bypass valve being controlled by said switch and said switch adapted to be attached to said motor bike.

2. A motor bike outrigger as in claim 1, further comprising two outriggers, each one adapted to be attached to opposing sides of said motor bike.

3. A motor bike outrigger as in claim 1, capable of providing a correct turn radius.

4. A motor bike outrigger as in claim 1, wherein said outrigger is made of metal.

5. A motor bike outrigger as in claim 1, wherein said outrigger is made of composite materials.

6. A motor hike outrigger as in claim 1, wherein said outrigger is made of plastic.

7. A motor bike outrigger as in claim 1, wherein said outrigger is constnicted in a manner which will minimize air resistance.

8. A motor hike outrigger as in claim 1, wherein said training wheel may alternately be a skid.

9. A motor bike outrigger compising;
    a) at least one structure adapted to be pivotally attached to a frame of a motorbike having a plurality of wheels at a plurality of locations; said at least one structure adapted to extend laterally to the direction of travel of said motorbike when said wheels are rolling;
    b) said at least one structure having a proximal end adapted to be pivotally attached to said frame of said motor bike, said at least one stnicture also having a distal end, said at least one stnicture also having a training wheel attached at the lower surface at said distal end thereof, said training wheel being adapted to contact the ground;
    c) said one structure further comprising;
        a) an enclosure having a first side adapted to be rigidly attached to said frame of said motor bike, said enclosure further having a disk positioned internally and surrounded by said enclosure, said disk being rotatable with respect to said enclosure and further having a one end of a support rod attached to said disk, said disk further having a plurality of friction surfaces attached to said disk, said supnort rod extending outside said enclosure and passing through said one structure;
        b) an adjustable nut attached to said support rod;
        c) a locking plate connecting said one structure and said support rod causing said one structure and said one support rod to be integrally connected in rotation, but capable of relative motion one to the other in the direction along the longitudinal axis of said stipport rod;
        d) a bearing, said bearing being interposed between said one structure and said enclosure and allowing relative rotational motion to occur between said one structure and said enclosure;
        e) a plurality of depressions on the outer surface of said enclosure;
        f) a pawl, said pawl being capable of engagement in said depressions and further said pawl being attached to said frame of said motor bike in a rotatable manner;
        g) a cable, said cable being connected to said pawl at one end of said cable and to a control lever at the other end of said cable.

10. A motor bike outrigger as in claim 9, further comprising two outriggers, each one adapted to be attached to opposing sides of said motor bike.

11. A motor bike outrigger as in claim 9, capable of providing a correct turn radius.

12. A motor bike outrigger as in claim 9, wherein said outrigger is made of metal.

13. A motor bike outrigger as in claim 9, wherein said oitrigger is made of composite materials.

14. A motor bike outrigger as in claim 9, wherein said outrigger is made of plastic.

15. A motor bike oiitrigger as in claim 9, wherein said outrigger is constructed in a manner which will minimize air resistance.

16. A motor hike outrigger as in claim 9, wherein said training wheel may alternately by a skid.

17. Motorbike outriggers as in claims 2 or 10 installed on a motorbike whereby the lateral forces generated by slippage of the tires of said motorbike and subsequent regripping of said tires on a surface, is reduced.

18. Motorbike outriggers as in claims 2 or 10 installed on a motor hike whereby slippage of the tires of said motorbike and falling of said motorbike to the ground, while said motorbike is in motion, is avoided.

* * * * *